US012323389B2

(12) United States Patent
Jia et al.

(10) Patent No.: US 12,323,389 B2
(45) Date of Patent: Jun. 3, 2025

(54) BEACON AND THREAT INTELLIGENCE BASED APT DETECTION

(71) Applicant: Palo Alto Networks, Inc., Santa Clara, CA (US)

(72) Inventors: Yanhui Jia, San Jose, CA (US); Qi Zhang, Saratoga, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 215 days.

(21) Appl. No.: 17/877,816

(22) Filed: Jul. 29, 2022

(65) Prior Publication Data

US 2024/0039893 A1    Feb. 1, 2024

(51) Int. Cl.
*H04L 9/40* (2022.01)

(52) U.S. Cl.
CPC ...... *H04L 63/0263* (2013.01); *H04L 63/0236* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 2011/0277034 A1* | 11/2011 | Hanson | ................. | G06F 21/554 709/224 |
| 2018/0097840 A1* | 4/2018 | Murthy | ................... | H04L 63/02 |
| 2018/0167949 A1* | 6/2018 | Del Carpio Vega | ......................... | H04W 72/541 |
| 2018/0183827 A1* | 6/2018 | Zorlular | ............. | H04L 63/1416 |
| 2022/0272108 A1* | 8/2022 | Huffman | ............ | H04L 63/1466 |

OTHER PUBLICATIONS

Author Unknown, Bowley Skewness: Definition, Formula, Alternate Formula, Statistics How to, Jul. 19, 2022.
Author Unknown, WhatIsMyBrowser.com, Latest user agents for Web Browsers &Operating Systems, Jul. 19, 2022.
Cobalt Strike, Software for Adversary Simulations and Red Team Operations, Jul. 25, 2022.
Fuentes et al., Modern Ransomware's Double, Extortion Tactics and How to Protect Enterprises Against Them, 2021, pp. 1-96.
Github et al., Malleable-C2-Profiles/youtube_video.profile at master • xx0hcd/Malleable-C2-Profiles, Jul. 26, 2022.
Karantzas et al., An Empirical Assessment of Endpoint Detection and Response Systems against Advanced Persistent Threats Attack Vectors, Journal of Cybersecurity and Privacy, J. Cybersecur. Priv. 2021, 1, pp. 387-421.

(Continued)

*Primary Examiner* — Thomas J Dailey
*Assistant Examiner* — Emad Siddiqi
(74) *Attorney, Agent, or Firm* — Van Pelt, Yi & James LLP

(57) ABSTRACT

Techniques for beacon and threat intelligence based Advanced Persistent Threat (APT) detection are disclosed. In some embodiments, a system/process/computer program product for beacon and threat intelligence based APT detection includes collecting firewall log data from monitored network traffic; analyzing the firewall log data at a cloud security service to identify beacon traffic based on a plurality of heuristics; performing a risk evaluation of the beacon traffic to detect malicious beacon traffic; and performing an action in response to detecting the malicious beacon traffic.

20 Claims, 14 Drawing Sheets

(56) References Cited

OTHER PUBLICATIONS

Lucian Constantin, SolarWinds Attack Explained: And Why it was so Hard to Detect, SolarWinds Hack, Dec. 15, 2020.
Palo Alto Networks, App-ID, Jul. 27, 2022.
Palo Alto Networks, AutoFocus, Tomorrow's Operations Depend on Unrivaled Threat Intelligence, Today; AutoFocus—World's Highest-Fidelity Contextual Threat Intelligence—Palo Alto Networks Jul. 26, 2022.
Palo Alto Networks, Cortex Data Lake, Good Data Built for Security Analytics, Jul. 26, 2022.
Palo Alto Networks, Cortex Xpanse, Find out How Xpanse Secures Remote Workers, Jul. 26, 2022.
Redis, A Vibrant, Open Source Database, Jul. 19, 2022.
Shalaginov et al., Malware Beaconing Detection by Mining Large-scale DNS Logs for Targeted Attack Identification, World Academy of Science, Engineering and Technology International Journal of Computer, Electrical, Automation, Control and Information Engineering vol. 10, No. 4, 2016, pp. 687-699.
Threatconnect, Smarter Security for Maximum Impact, Smarter Security for Maximum|l, Jul. 26, 2022.
Wikipedia, Median Absolute Deviation, Jul. 19, 2022.

* cited by examiner

| Factor | Description | Data Source |
|---|---|---|
| Session | 1 Src IP, 1 Dst Port, 1 APP, 1 URI/Cookie(with base64/base 64uri encoded), 0/1 Threat | CDL |
| GeoIP | Not the Same Country with customer location | Expanse |
| Certificate | Self signed certificate | Expanse |
| Passive DNS | Register Date less than 3 month Same IP address with different domain | Expanse |
| Active DNS | 0/1 Client IP founded | Expanse |
| SSH Reuse | Multiple SSH reuse record founded | Expanse |
| Behavior Observation | Port with different services Port 22 opened | Expanse |
| IP Category | Unknown or Malicious | AF |
| IP Relations | Malware communicate with dst IP. https://www.virustotal.com/gui/domain/cwsedge.net/relations | Virustotal |
| IP Reputaton from Third party TI | Malware | Threat Connect |

FIG. 4B

| BID | src IP | dst IP | dst port | beacon uri score | beacon uri | Session amount | risk | self signed certificate | encoded url | encoded cookie | encoded app list | app list | app conflict | verdict | |
|---|---|---|---|---|---|---|---|---|---|---|---|---|---|---|---|
| 9 | wAhF+NXDHVDK t3t0x0E= | 13.56.9.61 | 443 | 0.931 | api.crowdstrike.com/ | 14254 | medium | No | No | No | No | ssl | No | Benign | Change |
| 13 | wAhF+NHdAVTOqGJ0 | 72.13.116.25 | 443 | 0.948 | connect.ghx.com/ | 5691 | medium | No | No | No | No | ssl | No | benign | Change |
| 4 | wAhF+NHdBO/L | 23.96.18.32 | 443 | 0.991 | '.seemyradiology.com/ | 14537 | medium | No | No | No | No | ssl | No | Benign | Change |
| 8 | wAhF+NHdBO/L | 40.87.3.126 | 443 | 0.991 | '.seemyradiology.com/ | 16364 | medium | No | No | No | No | Incomplete.ssl | No | Benign | Change |
| 10 | wAhF+svHHVPKtA== | 40.87.3.126 | 443 | 0.997 | '.seemyradiology.com/ | 12173 | medium | No | No | No | No | Incomplete.ssl | No | Benign | Change |
| 1 | wAhF+NXdBE/JtQ== | 204.141.29.198 | 443 | 0.997 | 204.141.29.198/ | 10398 | High | No | No | No | No | Zoom-base | Yes | Benign | Change |
| 29 | sAhF/svCHVDOw== | 104.156.231.249 | 80 | 0.999 | 104.156.231.249// pixel.gif | 106 | high | Yes | No | Yes | No | web-browsing | No | benign | Change |
| 28 | sAhF/svCHVDOw== | 173.234.155.55 | 443 | 0.999 | cwsedge.net/ | 99 | high | No | No | No | No | ssl | No | malicious | Change |
| 30 | sAhF/svCHVDOw== | 45.76.202.187 | 80 | 0.999 | google.com/tab_shop? hello=true | 89 | high | No | No | Yes | No | web-browsing | No | malicious | Change |
| 14 | wAlF+tfdAFLUsWA== | 52.170.113.85 | 443 | 0.901 | | 1951 | High | No | No | No | No | Incomplete | Yes | Suspicious | Change |

SSL Certificate Info Analysis

| IP | Port | subjectCommon Names | subjectFull Name | issuerFull Name | isSelf Signed | first Observed | last Observed | signature Algorithm |
|---|---|---|---|---|---|---|---|---|
| 173.234.155.55 | 3389 | WIN-799RI0TSTOF | CN=WIN-799RI0TSTOF | CN=WIN-799RI0TSTOF | True | Feb.22,2021, midnight | Feb.24,2021, midnight | SHA256withRSA |
| 173.234.155.55 | 3389 | WIN-4K804V6ADVQ | CN=WIN-4K804V6ADVQ | CN=WIN-4K804V6ADVQ | True | March 3,2021, midnight | March 21,2021, midnight | SHA256withRSA |

522 ⟶

Passive DNS History

| REQUEST | RESPONSE | COUNT | TYPE |
|---|---|---|---|
| brandclothing.us | 173.234.155.55 | 13,428 | A |
| discount-gift.us | 173.234.155.55 | 56 | A |
| domain-renewal.us | 173.234.155.55 | 3,145 | A |
| gold-buyers.us | 173.234.155.55 | 2,139 | A |
| gold-chart.us | 173.234.155.55 | 1,525 | A |
| indiancar.us | 173.234.155.55 | 2,408 | A |
| marketing-group.us | 173.234.155.55 | 75 | A |
| nameorigin.us | 173.234.155.55 | 15,752 | A |
| sandparticles.us | 173.234.155.55 | 3,060 | A |
| secondary-school.us | 173.234.155.55 | 280 | A |
| torontolawyer.us | 173.234.155.55 | 301 | A |
| value-method.us | 173.234.155.55 | 12,120 | A |
| valuescale.us | 173.234.155.55 | 106 | A |

⊗ Community ⊙
 Score

ⓘ 2 detected files communicating with this IP address 173.234.155.55 (173.234.152.0/21)
AS 396362 (LEASEWEB-USA-NYC)

| DETECTION | DETAILS | RELATIONS | COMMUNITY ① |
|---|---|---|---|

Passive DNS Replication ⓘ

| Date resolved | Detections | Resolver | Domain |
|---|---|---|---|
| 2020-12-16 | 1 / 89 | VirusTotal | www.cwsedge.net |
| 2020-11-19 | 3 / 90 | VirusTotal | cwsedge.net |
| 2018-05-11 | 0 / 90 | VirusTotal | nameorigin.us |
| 2018-03-24 | 0 / 90 | VirusTotal | gold-buyers.us |

Communicating Files ⓘ

| Scanned | Detections | Type | Name |
|---|---|---|---|
| 2021-02-10 | 27 / 68 | Win32 EXE | intel.bin |
| 2020-12-17 | 46 / 70 | Win32 EXE | support.exe |

Historical Whois Lookups ⓘ

| Last Updated | Organization | | Email |
|---|---|---|---|
| + 2021-05-03 | | | |
| + 2020-11-19 | Ubiquity Server Solutions New York | | abuse@us.leaseweb.com |

Historical SSL Certificates ⓘ

FIG. 5D

Show [10 ▼] entries
530

| BID | src IP | dst IP | dst port | beacon score | uri | Session amount | risk | self signed certificate | encoded url | encoded cookie | app list | app conflict | verdict |
|---|---|---|---|---|---|---|---|---|---|---|---|---|---|
| 1 | wAhF+NXdBE/JtQ== | 204.141.29.198 | 443 | 0.997 | 204.141.29.198/ | 10398 | low | No | No | No | zoom-base | Yes | benign Change |
| 24 | wAFZ59TFC0/Jsnt3ww== | 52.74.4.251 | 80 | 0.945 | | 201 | medium | No | No | No | web-browsing, incomplete | No | Suspicious Change |
| 30 | sAhF/svCHVDOw== | 45.76.202.187 | 80 | 0.999 | google.com/tab_shop?hello=true | 89 | high | No | No | Yes | web-browsing | No | malicious Change |
| 29 | sAhF/svCHVDOw== | 104.156.231.249 | 80 | 0.999 | 104.156.231.249//pixel.gif | 106 | high | No | No | Yes | web-browsing | No | malicious Change |
| 11 | wAhF+9fBHVHUsmQ= | 20.150.29.196 | 443 | 0.997 | md-wxgwjrzpdp0f.blob.core.windows.net/ | 10531 | low | No | No | No | ssl.incomplete | No | Suspicious Change |
| 26 | wAhF+NLdAJDUtGR2 | 104.103.20.148 | 443 | 0.997 | wfbs-svc30-p.active update.trendmicro.com/ | 62 | low | No | No | No | ssl | Yes | Suspicious Change |
| 27 | wAhF/svCHVDO | 104.112.82.15 | 443 | 0.997 | osce12-en-census.trendmicro.com/ | 72 | low | No | No | No | ssl | No | Suspicious Change |
| 20 | wAJF+NfdAJDMqG1z | 35.211.48.243 | 443 | 0.917 | global-max.opera-mini.net/ | 255 | medium | No | No | No | ssl | No | Suspicious Change |
| 28 | sAhF/svCHVDOw== | 173.234.155.55 | 443 | 0.999 | cwsedge.net/ | 99 | high | Yes | No | No | ssl | No | Malicious Change |
| 6 | wAhF+NfdB1fUt2Q= | 104.170.39.208 | 443 | 0.945 | cpss1kc.cernerworks shared.com/ | 7477 | low | No | No | No | ssl | No | Suspicious Change |

| Analysis | | | | | | |
|---|---|---|---|---|---|---|
| IP | Port | subjectCommon Names | subjectFullName | issuerFullName | isSelf Signed | first Observed | last Observed |
| 204.141.29.198 | 443 | *.sc.zoom.us | C=US,ST=California, L=San Jose,O=Zoom Video Communications\, Inc.,CN=*.sc.zoom.us | C=US,O=DigiCert Inc,CN=DigiCert SHA2 Secure Server CA | False | Sept.18, 2020, midnight | March 12, 2021, midnight |

542

☐ Active DNS Info

| Analysis | | | | | |
|---|---|---|---|---|---|
| Client_ip | qname | qtype | rcode | rdata | rname |
| 51.158.67.154 | zoomsct198zc.sc.zoom.us. | 1 | 0 | 204.141.29.198 | zoomsct198zc.sc.zoom.us. |
| 165.232.55.188 | zoomsct198zc.sc.zoom.us. | 1 | 0 | 204.141.29.198 | zoomsct198zc.sc.zoom.us. |
| 51.15.139.19 | zoomsct198zc.sc.zoom.us. | 1 | 0 | 204.141.29.198 | zoomsct198zc.sc.zoom.us. |
| 51.15.139.19 | zoomsct198zc.sc.zoom.us. | 1 | 0 | 204.141.29.198 | zoomsct198zc.sc.zoom.us. |
| 161.35.229.189 | zoomsct198zc.sc.zoom.us. | 1 | 0 | 204.141.29.198 | zoomsct198zc.sc.zoom.us. |
| 45.56.87.174 | zoomsct198zc.sc.zoom.us. | 1 | 0 | 204.141.29.198 | zoomsct198zc.sc.zoom.us. |
| 45.56.87.174 | zoomsct198zc.sc.zoom.us. | 1 | 0 | 204.141.29.198 | zoomsct198zc.sc.zoom.us. |
| 45.56.87.174 | zoomsct198zc.sc.zoom.us. | 1 | 0 | 204.141.29.198 | zoomsct198zc.sc.zoom.us. |
| 51.15.139.19 | zoomsct198zc.sc.zoom.us. | 1 | 0 | 204.141.29.198 | zoomsct198zc.sc.zoom.us. |
| 165.232.55.188 | zoomsct198zc.sc.zoom.us. | 1 | 0 | 204.141.29.198 | zoomsct198zc.sc.zoom.us. |
| 51.15.139.19 | zoomsct198zc.sc.zoom.us. | 1 | 0 | 204.141.29.198 | zoomsct198zc.sc.zoom.us. |
| 165.232.55.188 | zoomsct198zc.sc.zoom.us. | 1 | 0 | 204.141.29.198 | zoomsct198zc.sc.zoom.us. |
| 74.207.233.60 | zoomsct198zc.sc.zoom.us. | 1 | 0 | 204.141.29.198 | zoomsct198zc.sc.zoom.us. |

544

Passive DNS History

| REQUEST | RESPONSE |
|---|---|
| zoomsct198zc.zoom.us. | 204.141.29.198 |

FIG. 5F

BEACON AND THREAT INTELLIGENCE BASED APT DETECTION

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 4B illustrates example risk evaluation factors used by a risk evaluation system for performing beacon and threat intelligence based APT detection in accordance with some embodiments.

FIGS. 5A-G illustrate example use cases for beacon and threat intelligence based APT detection in accordance with some embodiments.

DETAILED DESCRIPTION

Figure 1:
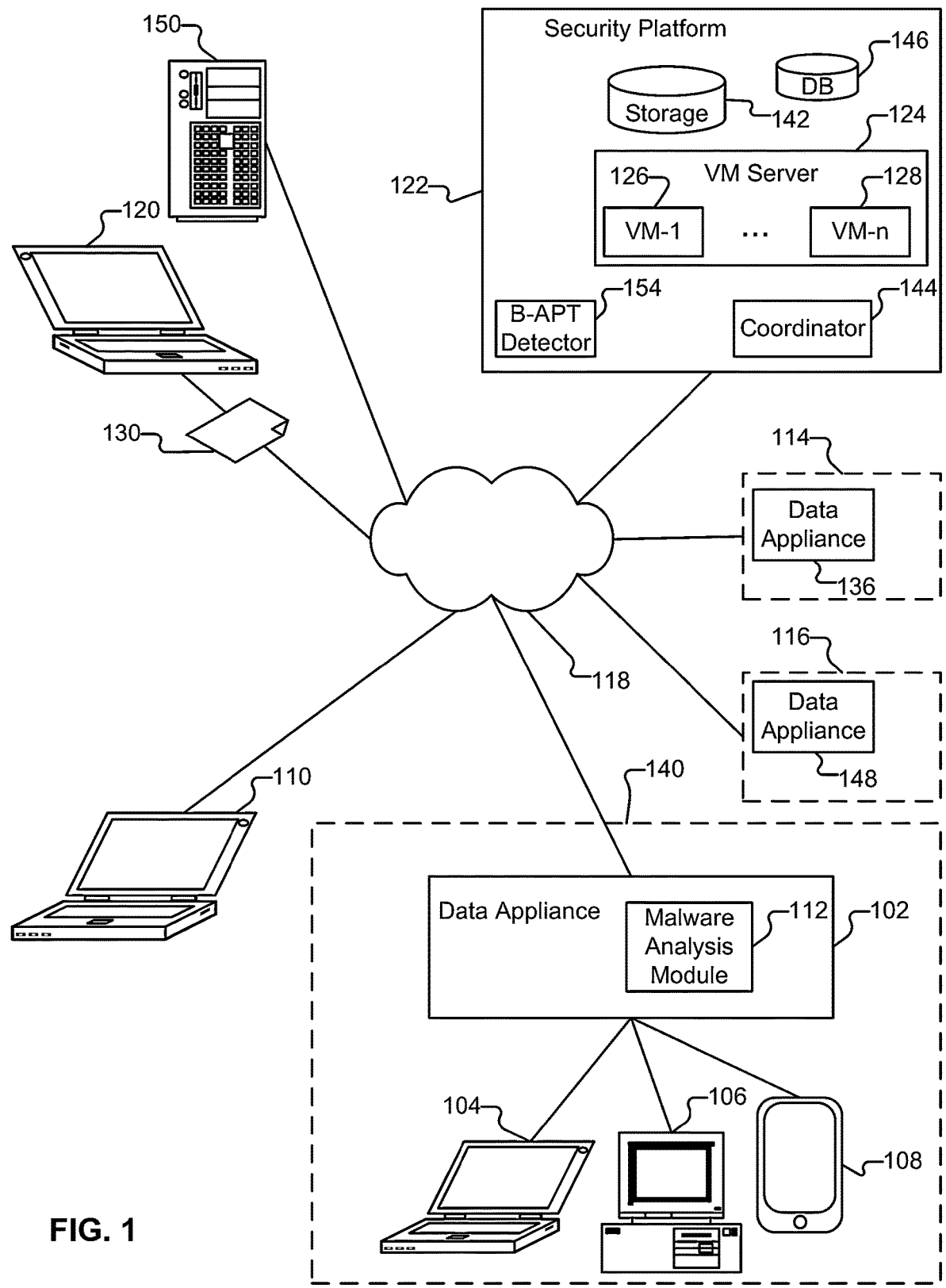
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Beacon and Threat Intelligence Based APT Detection

Generally, existing anti-malware security solutions often fail to detect new malware or new malware variants based on malware signatures that utilize attack approaches that simulate benign network traffic (e.g., predefined patterns, such as Intrusion Prevention System (IPS) signatures). Specifically, existing anti-malware security solutions generally fail to detect new malware or new malware variants if a malware signature (e.g., IPS signature) for that new malware or new malware variant does not yet exist (e.g., currently, signature-based content IPS solutions generally cannot detect the Cobalt Strike Beacon C2 traffic effectively as only the default profile(s) or known profile(s) can typically be detected using existing signature-based content IPS solutions). More specifically, HTTP/HTTPS traffic that simulates benign network traffic (e.g., utilizing benign/trusted URL destinations and paths, common/popular User Agents (UAs), but embedding payloads in encrypted and/or encoded cookies for each session; for an example of such malleable C2 profiles, see, e.g., https://github.com/xx0hcd/Malleable-C2-Profiles/blob/master/normal/youtube_video-.profile), such as further described below, is technically challenging for existing anti-malware security solutions to detect. These shortcomings associated with existing malware solutions expose enterprises to significant security risks due to the failure to detect such new malware or new malware variants.

A beacon, also known as a payload, generally refers to an executable or program (e.g., malware) that communicates back to a cyber attacker using a communication channel. As such, from the threat actor's point of view, beacon management is the foundation for their malicious campaign. Advanced Persistent Threat (APT) attacks often utilize such beacon approaches to implement their cyber-attack campaign against a given target (e.g., a user target, an enterprise target, a government target, and/or other entities can be targeted by such APT attacks).

Cobalt Strike is an example of a type of malware using evasion techniques to bypass malware solutions dependent on pattern matching based on preexisting malware signatures (e.g., penetration testing service providers (pen testers) often use Cobalt Strike (CS) tools to test commercially available security solutions, such as firewall security solutions). Cobalt Strike is a commercially/publicly available toolkit that is often used by researchers and penetration testers. However, it can also be used by attackers/hackers to infiltrate enterprise networks for unauthorized/nefarious purposes (e.g., exfiltration of confidential/proprietary data associated with enterprise networks using such Advanced Persistent Threat (APT) attacks, etc.). As an example, APT attacks, such as the well-known SolarWinds attack in 2020, or penetration tools, such as the well-known Cobalt Strike (CS) tools, utilize the above-described evasion technology to evade existing anti-malware security solutions. For reasons similarly described above, it is technically challenging to add new malware signatures to detect such APT attacks (e.g., cross-session attacks, without a risk of high false positives (FPs) that would result in identifying benign traffic as malicious traffic).

Specifically, malware writers can use a self-defined command and control (C2 or C&C) profile configuration for Cobalt Strike to avoid malware solutions dependent on pattern matching based on preexisting malware signatures. The Cobalt Strike toolkit generates C2 traffic that can be based on various protocols, including HyperText Transfer Protocol (HTTP), HyperText Transfer Protocol Secure (HTTPS), and Domain Name System (DNS) protocols.

Thus, what are needed are anti-malware security solutions that can efficiently and effectively detect potentially malicious beacon related network traffic activities.

Accordingly, new and improved techniques for beacon and threat intelligence based Advanced Persistent Threat (APT) detection are disclosed.

In some embodiments, a new beacon related APT detection system is disclosed that includes a beacon detection component and risk scoring component based on threat intelligence. In an example implementation, the disclosed beacon detection system utilizes Bowley Skewness and median absolute deviation as well as firewall logs (e.g., captured network traffic activity and associated meta information, such as IP addresses, ports, URLs, application identification, etc. as further described below) to automatically identify beacon communications between different clients and servers from monitored/captured network traffic (e.g., thousands to millions of sessions of enterprise network traffic). The identified subset of beacon traffic sessions are further analyzed using the risk scoring component based on threat intelligence information to automatically generate a risk score for each beacon of the identified subset of beacon traffic sessions based on the threat intelligence information (e.g., beacon traffic that exceeds a threshold score can be determined to be malicious C2 traffic activity, such as further described below). As such, the disclosed new beacon related APT detection system can facilitate effective and efficient detection of beacon related APT attacks that would otherwise evade existing anti-malware solutions.

In some embodiments, a system/process/computer program product for beacon and threat intelligence based Advanced Persistent Threat (APT) detection includes collecting firewall log data from monitored network traffic (e.g., network traffic that is monitored at a firewall or another data/network entity); analyzing the firewall log data at a cloud security service to identify beacon traffic based on a plurality of heuristics; performing a risk evaluation of the beacon traffic to detect malicious beacon traffic; and performing an action in response to detecting the malicious beacon traffic. For example, the disclosed techniques can automatically detect beacon traffic that is used as a communication channel for an advanced persistent threat (APT) attack.

In some embodiments, a system/process/computer program product for beacon and threat intelligence based APT detection further includes a beacon scoring component/system that identifies the beacon traffic based on a 3-tuple of source IP address, a destination IP address, and a destination port, time stamp information, and payload information associated with the beacon traffic.

In some embodiments, a system/process/computer program product for beacon and threat intelligence based APT detection further includes a risk evaluation system that evaluates the beacon traffic based on a plurality of risk evaluation factors including one or more of the following: session information, geographical IP information, certificate information, passive DNS information, active DNS information, SSH reuse information, behavior observation information, IP category information, IP relations information, and IP reputation information.

Accordingly, new and improved security solutions that facilitate beacon and threat intelligence based APT detection using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for beacon and threat intelligence based APT detection will be further described below.

Example System Architectures for Beacon and Threat Intelligence Based APT Detection Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying the disclosed techniques for automatically detecting beacon related APT attacks using the disclosed beacon and threat intelligence based APT detection techniques, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware and/or other forms of malware utilizing beacon traffic for embedding payloads for nefarious or malicious purposes).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 or other beacon related malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 or other beacon related malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
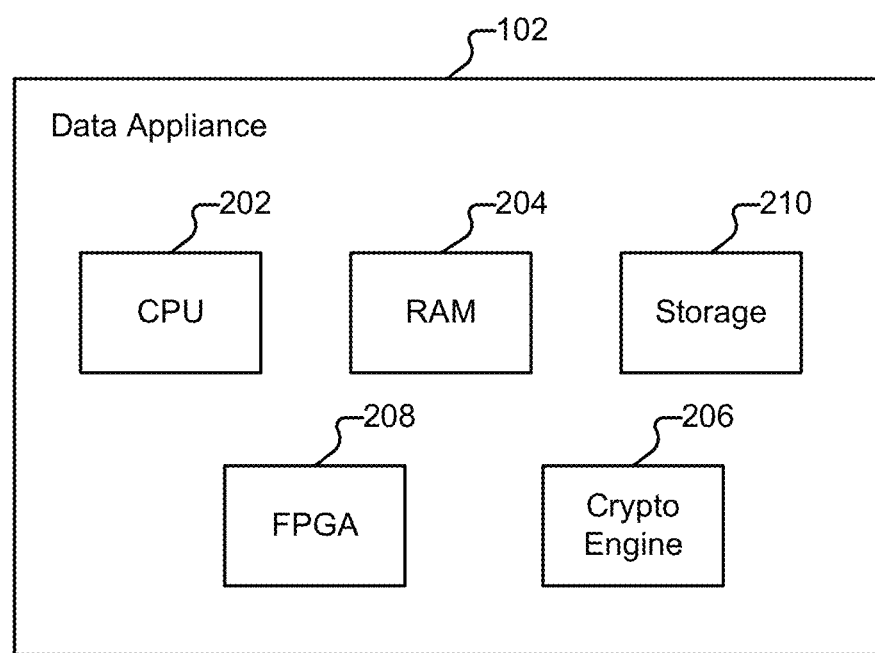
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
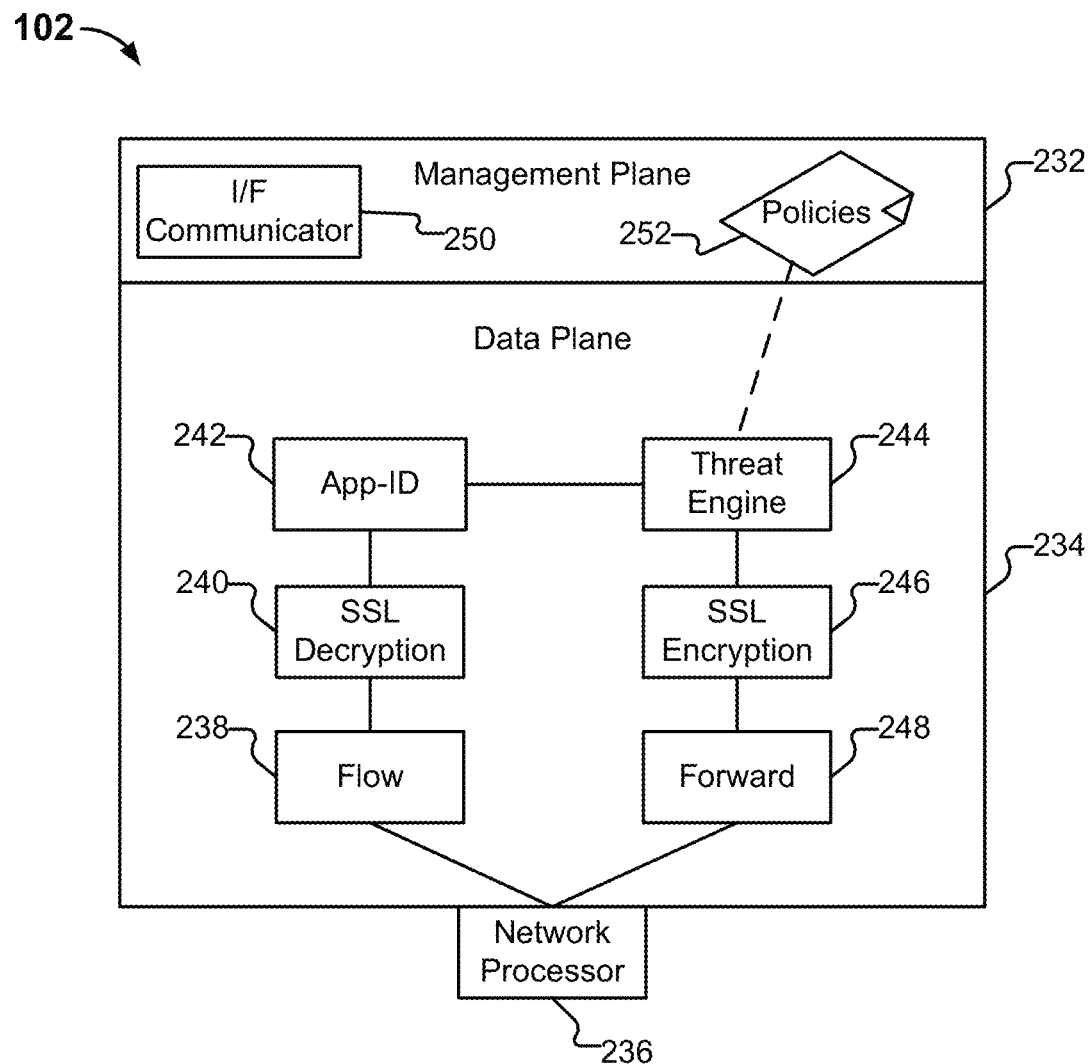
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 and/or other beacon related malware detection policies using the disclosed techniques for beacon and threat intelligence based APT detection. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130, such as malware for generating beacon related traffic (e.g., using a new/variant profile) to avoid detection by preexisting IPS signatures (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 and/or packet captures of monitored network traffic activities (e.g., sessions of network traffic activities, which may include beacon related network traffic activities) from data appliance 102 to perform cloud-based security analysis for performing beacon and threat intelligence based APT detection as further described herein, and the malware verdict can be sent back to data appliance 102 for enforcing the security policy to thereby safeguard Alice's client device 104 from execution of malware 130 (e.g., to block malware 130 from access on client device 104).

Further, security platform 122 can also provide other types of information to data appliance 102 (e.g., as part of a subscription) such as a set of information for performing the disclosed techniques for beacon and threat intelligence based APT detection usable by data appliance 102 to perform inline analysis of such malware files/network activity as will be further described below.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) and/or packet captures (pcap files) of monitored network traffic activities (e.g., sessions of network traffic activities, which may include beacon related network traffic activities) to security platform 122 for static/dynamic analysis and/or the disclosed automated analysis using the disclosed techniques for beacon and threat intelligence based APT detection, to determine whether it is malicious and/or to otherwise classify it.

Security platform 122 stores copies of received samples and/or other information (e.g., pcap files of network traffic activities/sessions) in storage 142 and analysis is commenced (or scheduled, as applicable). One example of storage 142 is an Apache Hadoop Cluster (HDFS) (e.g., or another data store for big data storage and analysis, such as further described below). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148, and/or a destination IP address can be added to a block list) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers, such as, for example, allow and block lists based on IP addresses and/or URLs, etc.) to data appliance 102 as part of a subscription. For example, security platform 122 can periodically send a content package that identifies malware files and/or block lists based on IP addresses and/or URLs, including for network traffic based heuristic IPS malware detection, etc. (e.g., daily, hourly, or some other interval, and/or based on an event configured by one or more policies). An example content package includes a Beacon-based Advanced Persistent Threat (B-APT) detector 154 and/or other information, such as further described below. The subscription can cover the analysis of just those files intercepted by data appliance 102 and sent to security platform 122 by data appliance 102, and can also cover signatures of malware known to security platform 122. As will be described in more detail below, platform 122 can also utilize other types of information for performing network traffic based heuristic IPS malware detection. Specifically, platform 122 can utilize B-APT detector 154 (e.g., which can be implemented as a plugin or sub-component of platform 122, such as will be further described below, such as with respect to FIGS. 4A and 4B), which can help data appliance 102 detect and perform inline blocking of potentially new/variant C2 and/or other beacon related malware (e.g., Cobalt Strike beacon C2 traffic and/or other beacon related malware traffic).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
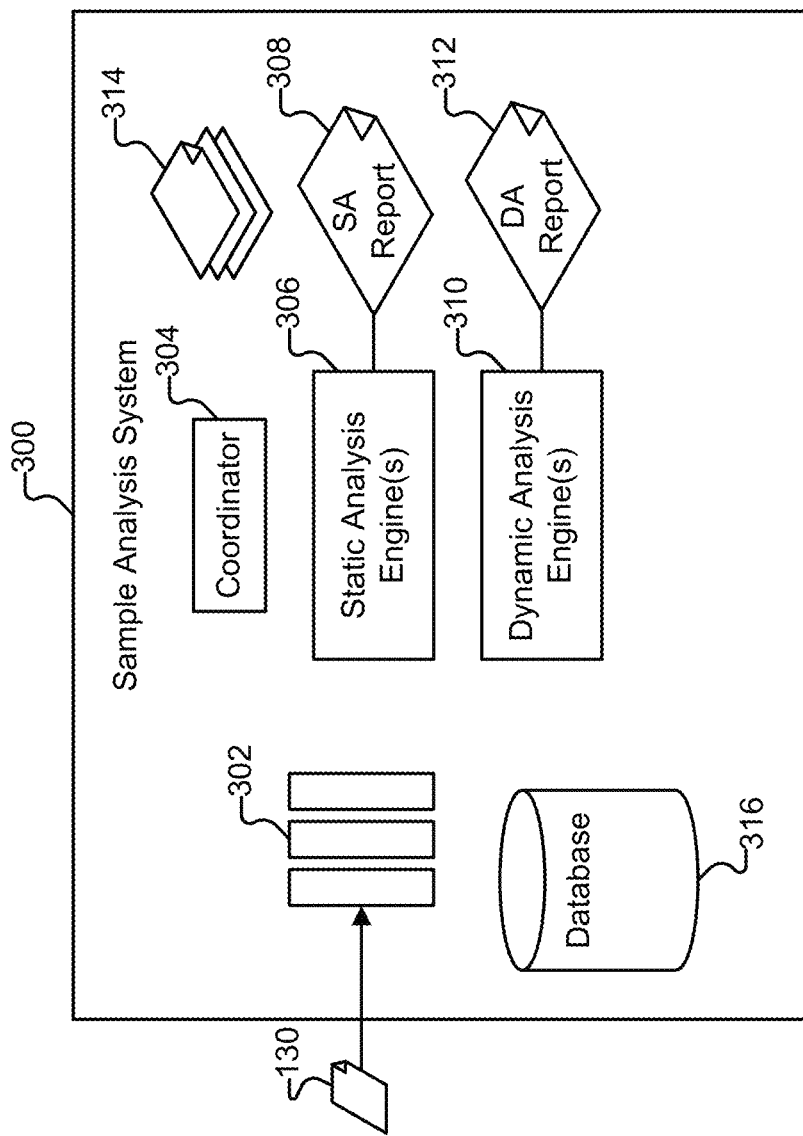
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described beacon and threat intelligence based APT detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Beacon and Threat Intelligence Based APT Detection

Figure 4A:
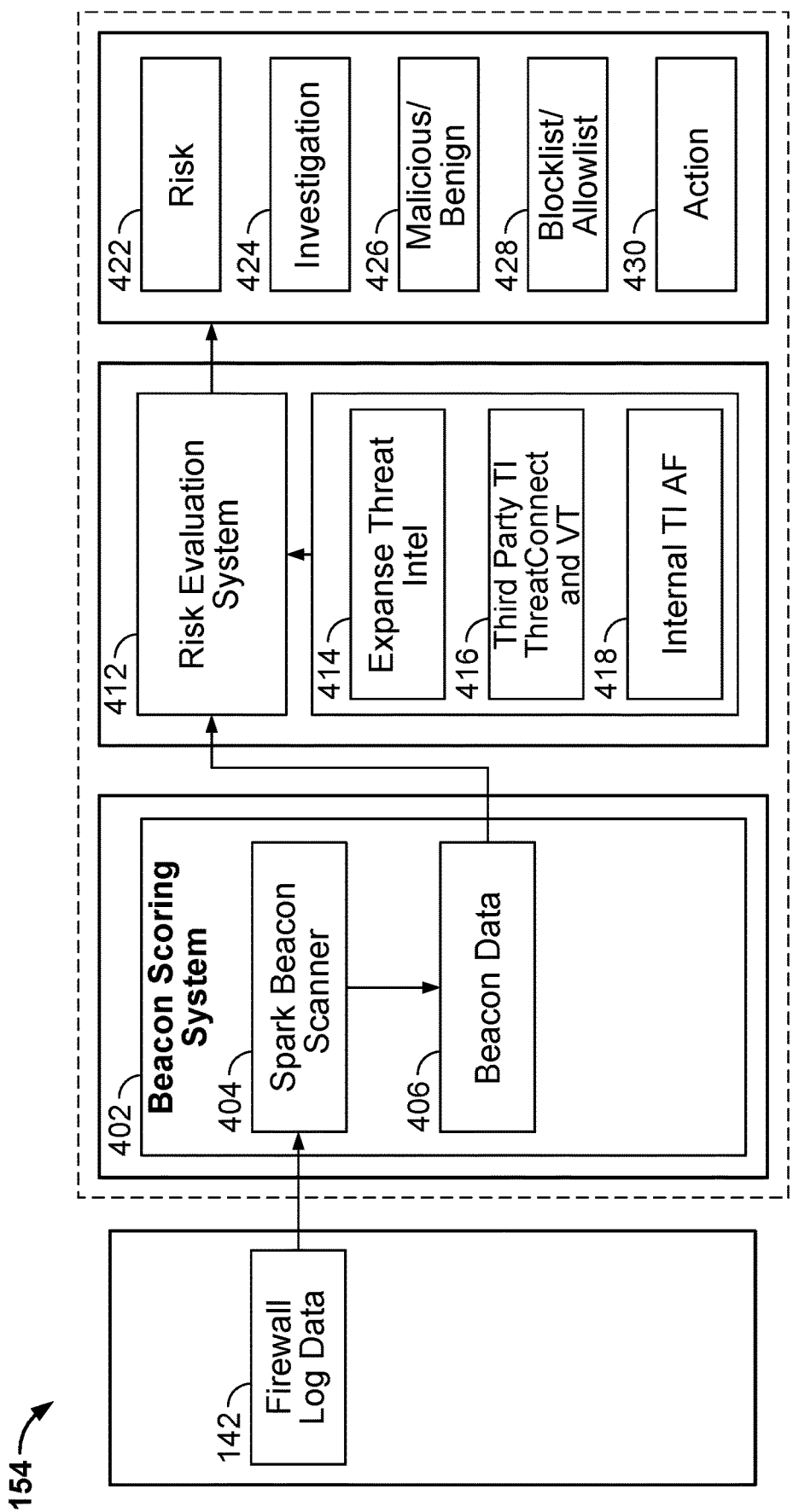
FIG. 4A illustrates portions of an example embodiment of a detection system and a quality check system for the processing of network traffic for performing beacon and threat intelligence based APT detection in accordance with some embodiments.

FIG. 4A illustrates portions of an example embodiment of a detection system and a quality check system for the processing of network traffic for performing beacon and threat intelligence based APT detection in accordance with some embodiments. As similarly discussed above, in various embodiments, security platform 122 includes a Beacon-based Advanced Persistent Threat (B-APT) detector 154. FIG. 4A illustrates subcomponents of B-APT detector 154 including the following sub-components: a beacon scoring system 402 and a risk evaluation system 412. The disclosed beacon and threat intelligence based APT detection system can assist and enhance APT detection capabilities. As shown in FIG. 4A, the beacon and threat intelligence based APT detection system includes beacon scoring system 402 and risk evaluation system 412 as will now be further described below.

As shown, firewall log data (e.g., pcap and associated firewall log data for monitored traffic sessions) that is stored in a data repository 142 (e.g., a cloud data store, such as the Cortex™ data lake that is commercially available from Palo Alto Networks headquartered in Santa Clara, CA, see https://www.paloaltonetworks.com/cortex/cortex-data-lake, or another big data storage solution can similarly be used for such a data repository) is provided as input to beacon scoring system 402. Beacon scoring system 402 includes a Spark Beacon Scanner 404 (e.g., a Spark implemented beacon scanner as further described below) to identify a subset of analyzed session traffic that is determined to be related to beacon traffic. The identified beacon traffic is output to beacon data 406.

The identified beacon traffic is provided as input to risk evaluation system 412 as also shown in FIG. 4A. The risk evaluation system utilized threat intelligence (TI) data to generate a score based on each set of beacon data. In this example implementation, the threat intelligence data includes Xpanse threat intel 414 (e.g., Cortex Xpanse TI data that is commercially available from Palo Alto Networks headquartered in Santa Clara, CA, see https://www.paloaltonetworks.com/cortex/cortex-xpanse, or similar TI data can similarly be utilized), third party threat intelligence (TI) ThreatConnect and VirusTotal (VT) data 416 (e.g., see https://threatconnect.com/ and see https://www.virustotal.com/, and/or similar TI data can be utilized), and internal TI data 418 (e.g., AutoFocus TI data that is commercially available from Palo Alto Networks headquartered in Santa Clara, CA, see https://www.paloaltonetworks.com/cortex/autofocus, or similar TI data can similarly be utilized).

The results of risk evaluation system 412 are provided to a risk subcomponent 422. The risk subcomponent provides the results to an investigation subcomponent 424 that can facilitate further investigation (if applicable), such as by security researchers (e.g., a Security Operations Center, which can perform a manual evaluation to validate such results, if necessary). Malicious/benign results 426 are used to update block lists and allow lists (e.g., based on destination IP and/or URL information) as shown at 428. An action can then be performed using the block lists and/or allow lists as shown at 430 (e.g., updated block lists and allow lists can be sent to firewalls of subscribing customers for filtering network traffic in their enterprise networks, such as data appliance 102 for enterprise network 140 as shown in FIG. 1).

The beacon scoring system utilizes the following 3-tuple for each session of traffic extracted from the firewall log data: the Source IP address (Src IP or SrcIP), Destination IP address (Dst IP or DstIP), and Destination Port (Dst Port or DstPort) associated with each new session and performs the following checks based on data statistics associated with each new session. In this example implementation, the beacon scoring system utilizes a Bowley Skewness and median absolute deviation algorithm and timestamps as well as a request payload length sent by the host to identify the beacon traffic.

Specifically, the beacon scoring system performs a data statistics analysis to determine whether the first twelve (12) sessions' timestamps is a Gaussian or normal distribution. In an example implementation, the Gaussian or normal distribution calculations can be implemented using the Bowley Skewness algorithm for a normal distribution calculation (e.g., the Bowley Skewness algorithm is publicly available at https://www.statisticshowto.com/bowley-skewness/, in which the Bowley Skewness algorithm is a way to figure out if you have a positively-skewed or negatively skewed distribution. you can use Bowley Skewness to find out more about the asymmetry of your distribution), and, specifically, to check whether it is a normal distribution for the timestamps from the first twelve (12) sessions. The median absolute deviation is determined using the Median absolute deviation algorithm (e.g., the median absolute deviation algorithm is publicly available at https://en.wikipedia.org/wiki/Median_absolute_deviation). The beacon scoring system identifies beacon traffic when the skewness and deviation of the timestamps and request payload length are close to zero (e.g., a perfect beacon). In this example, the above-described statistics analysis can be performed every 24 hours (e.g., or some other (periodic) time interval) based on the 3-tuple, timestamps, and request payload length to calculate a beacon score (e.g., a score range of 0 to 1, which corresponds to a beacon probability between 0% and 100%, in which a threshold of, for example, 0.9 can be used to identify given traffic as beacon traffic).

The risk evaluation system automatically determines a risk level for each beacon based on the threat intelligence module integration. For example, the risk score/evaluation results facilitate actions that can be performed for each beacon, such as to add the associated destination IP address to a block list or an allow list, to prioritize further beacon investigation and examine more details and attributes associated with the corresponding APT attack, and/or other actions can be performed as further described herein.

Specifically, the risk evaluation system performs an automated risk evaluation for each beacon using various forms of threat intelligence information as will now be further described with respect to FIG. 4B.

FIG. 4B is a table of example risk evaluation factors used by a risk evaluation system for performing beacon and threat intelligence based APT detection in accordance with some embodiments. As shown, various risk evaluation factors are used by a risk evaluation system for performing beacon and threat intelligence based APT detection. Specifically, the risk factor, a description of the risk factor, and the source of data for the threat intelligence information for evaluation of that risk factor is shown in the table illustrated in FIG. 4B.

As shown in the table, session information includes the 3-tuple information associated with the beacon traffic (e.g., source IP address, destination IP address, and destination port number), application identification (e.g., an identify of applications associated with monitored network traffic, including, for example, a category and a sub-category classification of the application(s) associated with the beacon network traffic, such as video-streaming, file-sharing, etc., which can be obtained from the firewall logs for the monitored beacon traffic, which is provided using the APP-ID technology that is commercially available from Palo Alto Networks, Inc. headquartered in Santa Clara, CA, see, e.g., https://www.paloaltonetworks.com/technologies/app-id), uniform resource information (URI), cookie information (e.g., with encoding information, such as base64/base64uri encoding), and 0/1 threat (e.g., whether there was any threat signature hit in this session, 0/1 means no/yes).

The geographical IP information indicates whether the destination IP address is located in a different geographical location (e.g., different region/country) than the source IP address (e.g., the customer's endpoint IP address associated with the beacon traffic session).

The certificate information indicates whether the destination (e.g., web site) is using a self-signed certificate (e.g., as opposed to a trusted certificate authority).

The passive DNS information indicates whether the destination (e.g., web site) was registered with a domain registry less than three months ago (e.g., same IP address associated with a plurality of IP domains is also information that is captured to indicate a potentially malicious destination associated with such beacon traffic).

The active DNS information indicates whether multiple domains bind to this IP in the past, and if so, the behavior is deemed suspicious.

The SSH reuse information indicates whether the server is logged in by multiple client machines with the same SSH private key, and if so, the behavior is deemed suspicious.

The behavior observation indicates whether the port number being used by the beacon traffic is typically used for different service, as such is another indicator of potentially suspicious beacon traffic (e.g., the port number for SSH is 22 by default, so if non-SSH traffic is using port 22, then this is another suspicious indicator).

The IP category information indicates whether the destination IP address associated with the beacon traffic is unknown or malicious.

The IP relations information is used to indicate whether malware was previously observed as communicating with the destination IP address associated with the beacon traffic.

As a final example risk evaluation factor, the IP reputation information is used to indicate whether the destination IP address is previously classified as being associated with malware (e.g., a malware IP address).

As an example, based on the beacon information, the destination IP address associated with the beacon traffic can be used to check any threat intelligence information associated with that destination IP address, such as risk evaluation factors described above with respect to FIG. 4B, including the GeoIP, IP category, IP relations, and IP reputation risk evaluation factors.

The risk evaluation system uses the above-described risk evaluation factors to automatically generate a risk score for each risk evaluation factor shown in the table in FIG. 4B, such as the self-signed certificate, passive DNS changed frequently, domain registered recently (e.g., a new domain), and other risk evaluation factors described above. The risk score can be generated as a number (e.g., 0 to 100) or as a level (e.g., low, medium, or high) using a composite scoring based on the above-described risk evaluation factors (e.g., and/or various other risk score algorithms can be used based on these and/or various other risk evaluation factors based on attributes associated with the beacon traffic).

An example high risk score includes a risk evaluation factor hit for at least three of the above-described risk evaluation factors (e.g., GeoIP different than customer location, using a self-signed certificate, and the IP category is malicious).

An example medium risk score includes a risk evaluation factor hit for at least two of the above-described risk evaluation factors (e.g., GeoIP different than customer location and the IP category is malicious).

An example low risk score includes a risk evaluation factor hit for at most one of the above-described risk evaluation factors (e.g., GeoIP different than customer location).

As such, the above-described techniques and example beacon scoring and risk evaluation system(s) facilitate an automated cross-session beacon-based APT detection solution using multi-dimension threat intelligence information that can be used by a security solution, such as described above with respect to FIGS. 1-4B.

Example Use Cases of Beacon and Threat Intelligence Based APT Detection

FIGS. 5A-G illustrate example use cases for beacon and threat intelligence based APT detection in accordance with some embodiments.

Figure 5A:
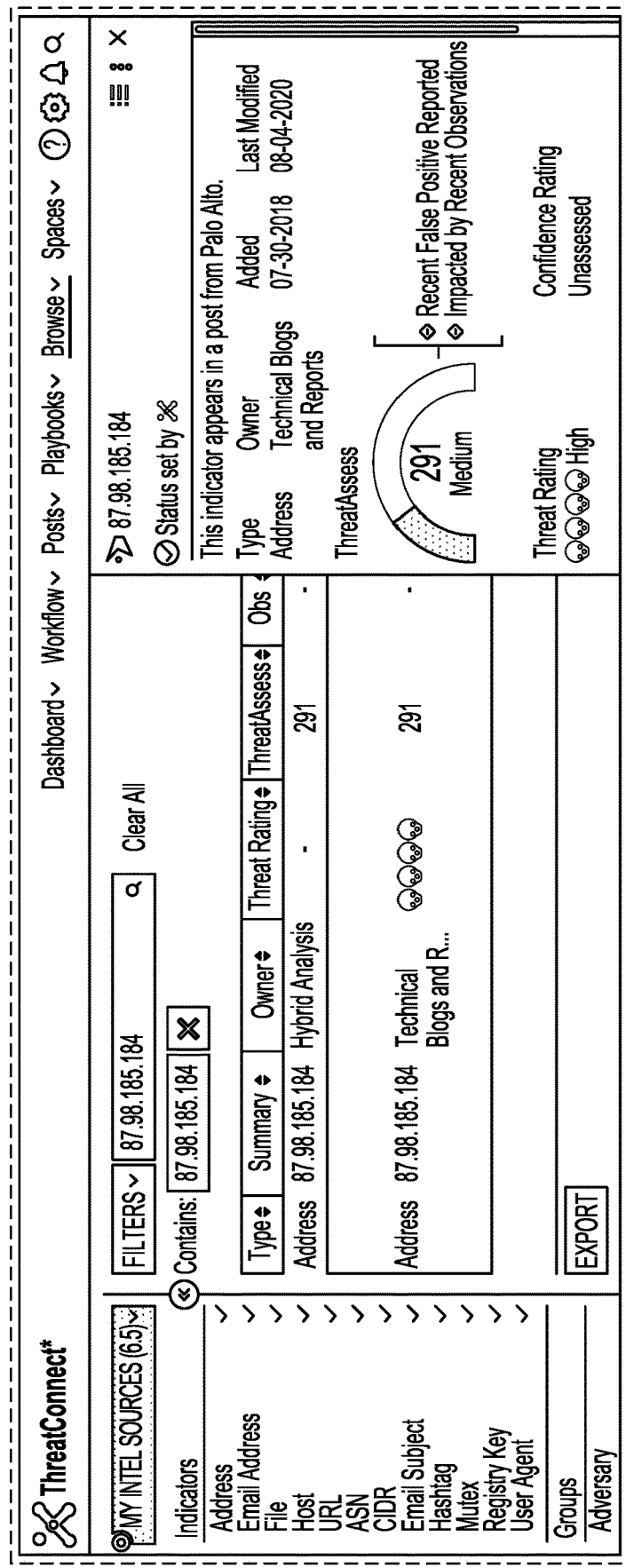

Referring to FIG. 5A, VirusTotal results for this destination IP address 87.98.185.184 available at https://www.virustotal.com/gui/ip-address/87.98.185.184/relations are shown in FIG. 5A.

Referring to FIG. 5B, these 3-tuple (Src IP, Dst IP, Dst port) entries in the table shown in this example are from the above-described firewall log data store 142 as shown in FIG. 4A. Each row also includes a beacon score that is generated using the above-described beacon scoring system 402 as shown in FIG. 4A. In this example, the traffic associated with the 3-tuple of Src IP: 192.168.180.137, Dst IP: 173.234.155.55, and Dst Port: 443 as shown at 510 of the table illustrates a beacon traffic score that is very high (e.g., 0.999 or 99.9%), which indicates a determination that this traffic associated with this 3-tuple is beacon traffic. The above-described risk evaluation system 412 as shown in the FIG. 4A evaluation of this beacon traffic (e.g., Dst IP 173.234.155.55) resulted in a risk score/level of high and a malware verdict as it was associated with a self-signed certificate as shown at 520 in FIG. 5C, multiple different passive DNS domains as shown at 522 in FIG. 5C, and VirusTotal (VT) Relations include malware that communicates with this Dst IP address of 173.234.155.55 as shown in FIG. 5D. A further manual analysis by security operations center (SOC) validated this malware verdict for such detected beacon traffic that was detected and evaluated using the above described techniques and the system(s) as described above with respect to FIGS. 1-4B.

Figure 5G:
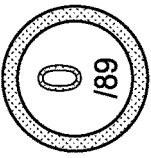

Referring to FIG. 5E, in this example, the traffic associated with the 3-tuple of Src IP: wAhF+NXdBE/JtQ==(e.g., obfuscated and base64 encoding applied to avoid sensitive data leak), Dst IP: 204.141.29.198, and Dst port: 443 as shown at 530 of the table illustrates a beacon traffic score that is still very high (e.g., 0.997 or 99.7%), which indicates a determination that this traffic associated with this 3-tuple is beacon traffic. The above-described risk evaluation system 412 as shown in the FIG. 4A evaluation of this beacon traffic (e.g., Dst IP 204.141.29.198) resulted in a risk score/level of low and a benign verdict as it was associated with a certificate signed from CA (i.e., not a self-signed certificate) as shown at 540 in FIG. 5F, the Dst IP address of 204.141.29.198 matches with Zoom as shown in the App-ID column in FIG. 5E (e.g., Zoom is a trusted application, and like many other legitimate applications it does use a heartbeat/beacon network communications, which illustrates the need to both identify beacon traffic and then to perform further risk factor related evaluations to determine if such is related to legitimate beacon traffic or malicious beacon traffic), active and passive DNS history is also related to Zoom as shown at 542 and 544, respectively, in FIG. 5F, and VirusTotal (VT) Relations does not indicate that any known malware communicates with this Dst IP address of 204.141.29.198 as shown in FIG. 5G. A further manual analysis by security operations center (SOC) validated this malware verdict for such detected beacon traffic that was detected and evaluated using the above described techniques and the system(s) as described above with respect to FIGS. 1-4B.

Example Processes for Beacon and Threat Intelligence Based APT Detection

Figure 6:
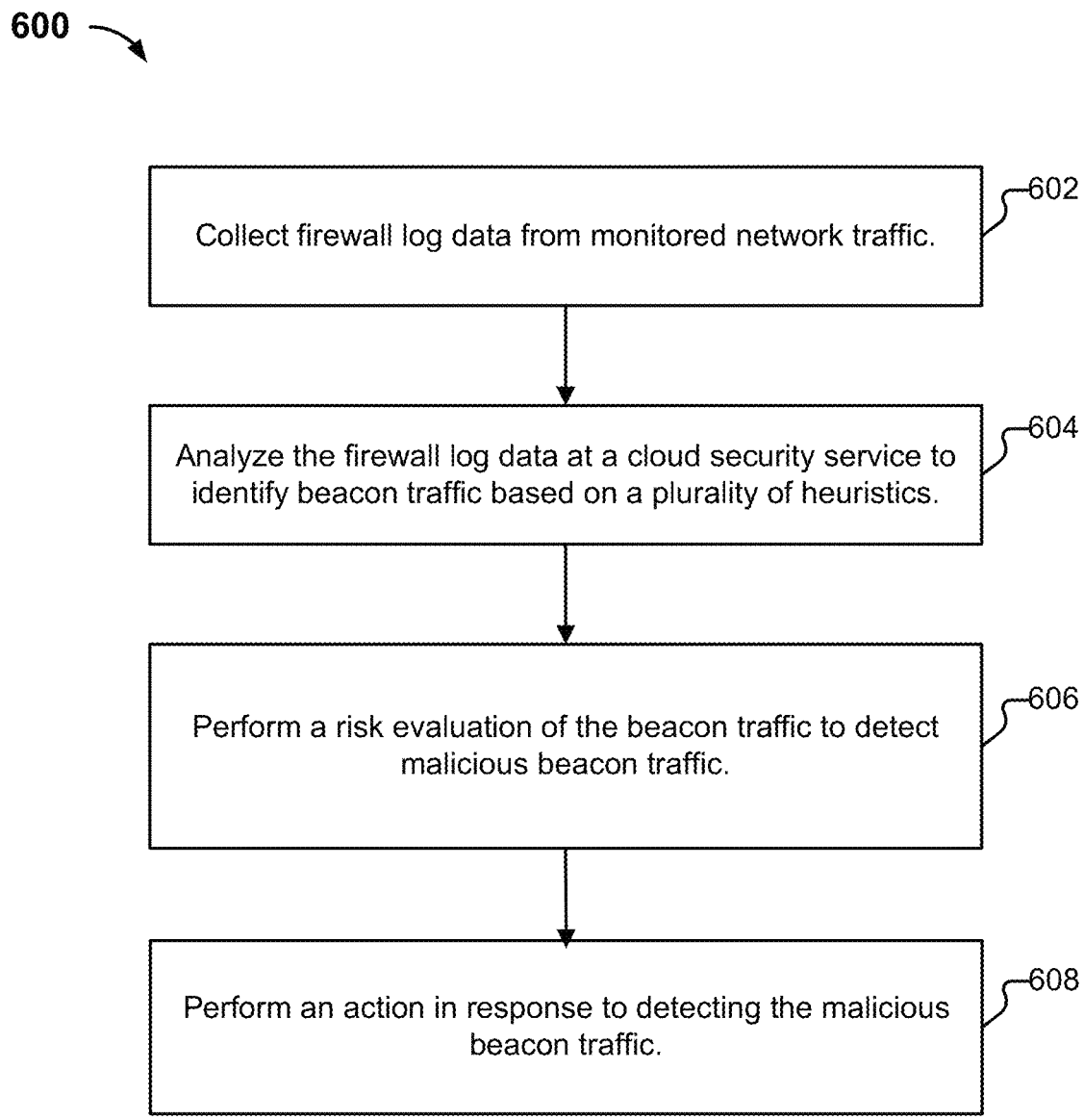
FIG. 6 is a flow diagram of a process for beacon and threat intelligence based APT detection in accordance with some embodiments.

FIG. 6 is a flow diagram of a process for beacon and threat intelligence based APT detection in accordance with some embodiments. In some embodiments, a process 600 as shown in FIG. 6 is performed by the security platform and techniques as similarly described above including the embodiments described above with respect to FIGS. 1-5G. In one embodiment, process 600 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, firewall log data is collected from monitored network traffic. For example, a firewall can monitor network traffic at an enterprise network and generate firewall log data that can be forwarded to/collected by a cloud security service for further analysis, such as similarly described above with respect to FIGS. 1 and 4A.

At 604, the firewall log data is analyzed at a cloud security service to identify beacon traffic based on a plurality of heuristics. In some embodiments, a system/process/computer program product for beacon and threat intelligence based Advanced Persistent Threat (APT) detection further includes a beacon scoring component/system that identifies the beacon traffic based on a 3-tuple of a source IP address, a destination IP address, and a destination port, time stamp information, and payload information associated with the beacon traffic, such as similarly described above with respect to FIGS. 4A and 5A-5G.

At 606, a risk evaluation of the beacon traffic to detect malicious beacon traffic is performed. In some embodiments, a system/process/computer program product for beacon and threat intelligence based Advanced Persistent Threat (APT) detection further includes a risk evaluation system that evaluates the beacon traffic based on a plurality of risk evaluation factors including one or more of the following: session information, geographical IP information, certificate information, passive DNS information, active DNS information, SSH reuse information, behavior observation information, IP category information, IP relations information, and IP reputation information, such as similarly described above with respect to FIGS. 4A-4B and 5A-5G.

At 608, an action is performed in response to detecting the malicious beacon traffic. The security platform (122) and/or data appliance (102) can then perform an action based on a policy (e.g., security/beacon related malware policy, which can be stored in policies 252 as shown in FIG. 2B) in response to the malware verdict. For example, the data appliance can be configured to block the malicious beacon/APT related traffic activity. Other example actions can include blocking access to the destination IP address associated with the detected malicious beacon/APT related traffic activity, blocking/dropping the network traffic associated with the detected malicious beacon/APT related traffic activity and/or associated with that destination IP address, alerting an endpoint user and/or a network/security administrator that the endpoint was associated with the detected malicious beacon/APT related traffic activity, quarantining an endpoint device associated with the detected malicious beacon/APT related traffic activity, identifying the destination IP address, URL, etc. associated with the detected malicious beacon/APT related traffic activity as malicious (or potentially malicious), and/or various other actions can also be performed based on the policy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
collect firewall log data from monitored network traffic;
analyze the firewall log data at a cloud security service to identify beacon traffic based on a plurality of heuristics, comprising to:
identify a subset of the monitored network traffic that is determined to be related to the beacon traffic, comprising to:
identify, using a skewness measurement technique, skewness of a first 12 sessions' timestamps of the subset;
determine, based on a median absolute deviation technique, a request payload length deviation for a new session identified in the firewall log data; and
identify the beacon traffic based on the request payload length deviation and the skewness;
perform a risk evaluation of the beacon traffic to detect malicious beacon traffic; and
perform an action in response to detecting the malicious beacon traffic; and
a memory coupled to the processor and configured to provide the processor with instructions.

2. The system of claim 1, wherein the beacon traffic is used as a communication channel for a cyber-attack.

3. The system of claim 1, wherein the beacon traffic is used as a communication channel for an advanced persistent threat (APT) attack.

4. The system of claim 1, wherein a beacon scoring system identifies the beacon traffic based on a 3-tuple, wherein the 3-tuple includes a of source IP address, a destination IP address, and a destination port.

5. The system of claim 1, wherein a beacon scoring system identifies the beacon traffic based on a 3-tuple of source IP address, a destination IP address, and a destination port, time stamp information, and payload information associated with the beacon traffic.

6. The system of claim 1, wherein the risk evaluation of the beacon traffic is based on a plurality of risk evaluation factors.

7. The system of claim 1, wherein the risk evaluation of the beacon traffic is based on a plurality of risk evaluation factors including one or more of the following: session information, geographical IP information, certificate information, passive DNS information, active DNS information, SSH reuse information, behavior observation information, IP category information, IP relations information, and IP reputation information.

8. A method, comprising:
collecting firewall log data from monitored network traffic;
analyzing the firewall log data at a cloud security service to identify beacon traffic based on a plurality of heuristics, comprising:
identifying a subset of the monitored network traffic that is determined to be related to the beacon traffic, comprising:
identifying, using a skewness measurement technique, skewness of a first 12 sessions' timestamps of the subset;
determining, based on a median absolute deviation technique, a request payload length deviation for a new session identified in the firewall log data; and
identifying the beacon traffic based on the request payload length deviation and the skewness;
performing a risk evaluation of the beacon traffic to detect malicious beacon traffic; and
performing an action in response to detecting the malicious beacon traffic.

9. The method of claim 8, wherein the beacon traffic is used as a communication channel for a cyber-attack.

10. The method of claim 8, wherein the beacon traffic is used as a communication channel for an advanced persistent threat (APT) attack.

11. The method of claim 8, wherein a beacon scoring system identifies the beacon traffic based on a 3-tuple, wherein the 3-tuple includes a of source IP address, a destination IP address, and a destination port.

12. The method of claim 8, wherein a beacon scoring system identifies the beacon traffic based on a 3-tuple of source IP address, a destination IP address, and a destination port, time stamp information, and payload information associated with the beacon traffic.

13. The method of claim 8, wherein the risk evaluation of the beacon traffic is based on a plurality of risk evaluation factors.

14. The method of claim 8, wherein the risk evaluation of the beacon traffic is based on a plurality of risk evaluation factors including one or more of the following: session information, geographical IP information, certificate information, passive DNS information, active DNS information, SSH reuse information, behavior observation information, IP category information, IP relations information, and IP reputation information.

15. A computer program product embodied in a non-transitory computer readable medium and comprising computer instructions for:
   collecting firewall log data from monitored network traffic;
   analyzing the firewall log data at a cloud security service to identify beacon traffic based on a plurality of heuristics, comprising:
      identifying a subset of the monitored network traffic that is determined to be related to the beacon traffic, comprising:
      identifying, using a skewness measurement technique, skewness of a first 12 sessions' timestamps of the subset;
      determining, based on a median absolute deviation technique, a request payload length deviation for a new session identified in the firewall log data; and
      identifying the beacon traffic based on the request payload length deviation and the skewness;
   performing a risk evaluation of the beacon traffic to detect malicious beacon traffic; and
   performing an action in response to detecting the malicious beacon traffic.

16. The computer program product of claim 15, wherein the beacon traffic is used as a communication channel for a cyber-attack.

17. The computer program product of claim 15, wherein the beacon traffic is used as a communication channel for an advanced persistent threat (APT) attack.

18. The computer program product of claim 15, wherein a beacon scoring system identifies the beacon traffic based on a 3-tuple, wherein the 3-tuple includes a of source IP address, a destination IP address, and a destination port.

19. The computer program product of claim 15, wherein a beacon scoring system identifies the beacon traffic based on a 3-tuple of source IP address, a destination IP address, and a destination port, time stamp information, and payload information associated with the beacon traffic.

20. The computer program product of claim 15, wherein the risk evaluation of the beacon traffic is based on a plurality of risk evaluation factors.

* * * * *